Patented Apr. 22, 1952

2,594,213

UNITED STATES PATENT OFFICE 2,594,213

PROCESS FOR THE STERILIZATION OF SALTED FOODS AND MATERIALS

Otto Rahn, Ithaca, N. Y.

No Drawing. Application May 5, 1949,
Serial No. 91,626

4 Claims. (Cl. 99—186)

This invention relates to the canning of foods, particularly those lacking in natural acidity. Most fruits, such as peaches, cherries and berries for example, being naturally acid, are easily canned by ordinary methods in boiling water without special pressure, since the acidity assists the sterilization. However, with other foods, such as vegetables, meat, sea-food, and even some fruits, such a simple method does not suffice, and pressure canning to give higher temperatures is used. The higher temperature is then sufficient to kill the bacteria but often impares the texture, color or quality of the food. Some attempts have been made to acidify non-acid foods to avoid such high temperatures, but they have tended to leave an unnatural flavor, cause gasification, or leave some danger of botulism, so that pressure canning of such foods has remained the standard practice.

The presence of common salt (sodium chloride) is not objectionable in ordinary amounts. Where the natural product contains only a very small amount of it, salt is added to all meats and all vegetables, and even to some fruits like tomatoes. This is so customary in the canning industry that the liquid added to vegetables in the can is commonly called "brine." However, such ordinary methods of adding salt are not at all sufficient to change the fact that pressure canning is required; and so the texture and quality have continued to be impaired. In the present invention high quality is retained by avoiding the high temperatures of pressure canning while achieving the desired sterilization and keeping the flavor.

The basic idea which distinguishes this invention from other processes is that instead of salting the food with sodium chloride (ordinary salt) as such, its two chemical constituents are added separately as hydrochloric acid and sodium hydroxide at different times, combining to form ordinary salt and water. At first, an equivalent amount of hydrochloric acid is added to the food, which is then sterilized in a closed container in the acid condition at the ordinary temperatures of non-pressure canning. At a later time an equivalent amount of sterile sodium hydroxide is added aseptically, and combines with the hydrochloric acid in the can without objectionable gasification so that in the end the food contains neither sodium hydroxide nor hydrochloric acid but merely sodium chloride, that is, ordinary salt, which is desirable for its flavoring anyway. The process does not necessarily require temperatures above the boiling point of water for the reason that the hydrogen ions of the acid are very efficient bactericidal agents even below the boiling point as well as above. Thus any food canned by this process will not be changed as much in taste and appearance by overheating as occurs by the customary canning processes.

Though the end result produces salt, the sterilization actually occurs under the most favorable acid conditions, avoiding pressure heating, and so maintaining the natural quality.

It has been generally known that acid speeds up heat sterilization, and that the heat resistant spores of bacteria are more easily destroyed when heated in an acid medium. Artichokes for example were practically impossible to can by ordinary pressure methods, because heat sufficient to kill the bacteria destroyed the texture of the artichoke; and so they are canned in a solution of citric acid which must be removed by washing before eating. While such a process preserved the texture, the removal of the acid by washing also removed a large share of the natural flavor, thus differing from the present process. However, it illustrates the effect of acidity so far as sterilization is concerned. Neutralization of the citric acid by an alkali was not suggested, probably because it would produce the foreign taste of sodium citrate. The so-called "lemon juice method" at one time popular in California was somewhat similar, delivering an acid flavor which was neutralized by sodium bicarbonate after the can was opened. The danger of botulism led to its abandonment.

Artificial acidification before processing can produce a normal flavor, only if the acid is later neutralized without washing or rinsing, and only if the neutral salt obtained by the neutralization of the acid is a natural constituent of the food. Food contains only one such constituent in sufficient amount, namely, common salt, sodium chloride. It is found in or is normally added to practically all food of the type requiring pressure canning, including meats, sea-food, vegetables and some fruits, and is so acceptable that it is not considered a foreign flavor. Hence the successive addition of balanced amounts of hydrochloric acid and sodium hydroxide in a sealed container is unobjectionable, since it only reaches the consumer in the agreeable form of normal salt and there is no gasification to bulge the can. But the sterilization and preservation of natural quality is thereby greatly facilitated.

Furthermore, the desirable flavoring is enhanced by the intimacy with which the salt is actually created within the cellular structure.

Since the hydrochloric acid and the sodium hydroxide must both actually penetrate into the very heart of the material in order to function, it is evident that the common salt thereby resulting must be equally intimately located. The salt concentrate is only about one or two percent, which is definitely normal to the taste, so that the food does not seem unduly salty.

From the foregoing it will be seen that the invention avoids the high temperatures ordinarily needed to accomplish complete sterilization; and while it relates primarily to the canning of vegetables, meat, sea-foods and non-acid fruits, the principle is also applicable to the sterilization of medical and other equipment made of materials such as rubber or cat-gut, where penetration is possible and high temperatures might impare quality.

The processing of food must be done carefully in order to obtain the best results. When the food is placed in the acid brine, the acid does not penetrate immediately, and if bacterial spores are deeply imbedded is some part of the food they might survive heating to 212° F. if this were to take place directly after filling and closing the can. It is recommended that the food in the acid can. brine be allowed to stand at a temperature near freezing to prevent microbial multiplication before the acid is distributed uniformly. The time required for the diffusion of the acid thru the food will depend upon the type of food as well as upon the size of the food particles. With peas, two days proved sufficient; with meat in pieces of not more than half an inch in length or width, four days were necessary. The rate of diffusion can be increased by occasional rolling or other agitation of the contents of the can.

The amount of acid to be added depends upon the buffering value of the food. The final pH after complete diffusion should not exceed 4.5. With most foods a pH between 2 and 3 is most desirable.

The heating in the closed container is done only after the acid is distributed uniformly throughout the food. Only then can it be considered certain that all the spores even in the remotest places of the food will be killed by heating to a temperature in the neighborhood of 212° F. With delicate structures, lower temperatures may be used in combination with higher acidity, (lower pH). The optimal temperature, the optimal acidity and the necessary heating time cannot be specified, for they will differ with each type of food as well as with the size of the container.

After heating, the food is sterile in the closed container but too acid for consumption. The neutralizing alkali may be added at any time after sterilization. The sodium hydroxide must be sterile and must be added aseptically. Here again, several days are required for the added alkali to become uniformly distributed by diffusion thruout the food. The precisely measured acid, alkali neutralizes the precisely measured acid, and the result is a sterile food with a precisely known content of sodium chloride.

The alkali may be added by various means. It may be present in the can during sterilization in a container which does not release it until after the acid sterilization is completed, or it may be injected into the can by a hollow needle puncturing the can, provided the hole is promptly soldered. Various techniques are known for delayed combinations of chemicals in a closed container and may be applied to this process as will be apparent to those skilled in the art, as well as improvements in such techniques as may be developed in the future. Regardless of the mechanism or utensil used the essential steps of this method are the successive introduction of first the hydrochloric acid and later aseptically the alkaline element sodium hydroxide to make common salt, with the sterilization occurring at moderate heat during the existence of the acid condition.

There can be no objection to the treatment with hydrochloric acid and the alkali sodium hydroxide from the standpoint of public health because neither of the reagents, in the small quantities used, can be considered a poison. The acidity of the can during heating is not stronger than that in the human stomach. If any mistake should be made in the dosage of either of the two compounds, their pronounced taste would make the food unpalatable before it could become dangerous to health.

I claim as my invention:

1. A process for the canning of salted foods and materials which consists in adding thereto hydrochloric acid to insure an acid condition with a pH under 4.5, sealing it within a can, sterilizing by heat below the temperatures ordinarily employed in pressure canning, and subsequently adding aseptically an equivalent amount of sodium hydroxide to combine with the hydrochloric acid within the sealed can so as to form common salt (sodium chloride) in palatable amounts, and holding the can off the market for several days so that the alkali will diffuse uniformly to create the salt intimately in the cell structure, whereby the foods and materials are sterilized in an acid condition and utilized in a salted condition.

2. A process for the canning of foods such as vegetables, meats, sea-foods and non-acid fruits, which consists in adding hydrochloric acid to such food to insure an acid condition with a pH under 4.5, sealing it within a can, sterilizing by heat at the temperatures normally employed in the canning of acid foods, and thereafter adding aseptically a sufficient amount of sodium hydroxide to neutralize the hydrochloric acid within the sealed can and by chemical combination create sodium chloride (common salt) within the sterilized food in palatable amounts, and holding the can off the market for several days so that the alkali will diffuse uniformly to create the salt intimately in the cell structure, whereby non-acid food can be kept for human consumption without resort to the high temperatures associated with pressure canning.

3. A process for the canning of foods such as vegetables, meats, sea-foods and non-acid fruits, which consists in adding hydrochloric acid to such food to insure an acid condition with a pH under 4.5, sealing it within a can, storing it at a temperature near freezing until the acid is uniformly distributed thruout the food, then sterilizing it by heat at the temperatures normally employed in the canning of acid foods, and after such sterilization aseptically adding to said food in the can a sufficient amount of sterile sodium hydroxide to neutralize the hydrochloric acid within the sealed can and by chemical action create sodium chloride (common salt) within the food, the amounts of hydrochloric acid and sodium hydroxide being such that the resulting salt is present in palatable amounts, and holding the can off the market for several days so that the alkali will diffuse uniformly to create the salt intimately in the cell structure, whereby the texture and quality of such food may be protected from the impairment sometime associated with the pressure canning of non-acid foods.

4. A process for the canning of foods such as vegetables, meats, sea-foods and non-acid fruits, which consists in adding hydrochloric acid to such food to insure an acid condition, sealing it within a can, agitating the can to expedite uniform distribution of the acid at a pH under 4.5 and storing it at a temperature near freezing until the acid is uniformly distributed thruout the food, then sterilizing it by heat at the temperatures normally employed in the canning of acid foods, and after such sterilization aseptically adding to said food in the can a sufficient amount of sterile sodium hydroxide to neutralize the hydrochloric acid within the sealed can and by chemical action create sodium chloride (common salt) within the food, the amounts of hydrochloric acid and sodium hydroxide being such that the resulting salt is present in palatable amounts, and holding the can off the market for several days so that the alkali will diffuse uniformly to create the salt intimately in the cell structure, whereby the impairment of texture and quality associated with pressure canning is avoided.

OTTO RAHN.

REFERENCES CITED

The following references are of record in the file of this patent:

UNITED STATES PATENTS

| Number | Name | Date |
|---|---|---|
| 1,098,006 | Allen | May 26, 1914 |
| 2,133,117 | Schroder | Oct. 11, 1938 |
| 2,187,713 | Wilbur | Jan. 23, 1940 |
| 2,390,468 | Schroder et al. | Dec. 4, 1945 |
| 2,400,123 | Levinson | May 14, 1946 |
| 2,434,388 | Brehm | Jan. 13, 1948 |

OTHER REFERENCES

"Commercial Fruit & Veg. Products," by Cruess, 1938, 2nd ed., page 121.